(12) United States Patent
Liu et al.

(10) Patent No.: US 7,676,520 B2
(45) Date of Patent: Mar. 9, 2010

(54) CALCULATING IMPORTANCE OF DOCUMENTS FACTORING HISTORICAL IMPORTANCE

(75) Inventors: Tie-Yan Liu, Beijing (CN); Hang Li, Beijing (CN); Lei Qi, Qingdao Shandong Province (CN); Bin Gao, Beijing (CN); Lei Yang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 11/734,336

(22) Filed: Apr. 12, 2007

(65) Prior Publication Data

US 2008/0256051 A1 Oct. 16, 2008

(51) Int. Cl.
G06F 7/00 (2006.01)
G06F 17/30 (2006.01)
(52) U.S. Cl. ...................................... 707/748
(58) Field of Classification Search .............. 707/5, 707/7
See application file for complete search history.

(56) References Cited

U.S. PATENT DOCUMENTS

| 6,560,600 | B1 | 5/2003 | Broder | |
|---|---|---|---|---|
| 6,847,967 | B1 | 1/2005 | Takano | |
| 7,076,483 | B2 | 7/2006 | Preda et al. | |
| 7,080,073 | B1 | 7/2006 | Jiang et al. | |
| 7,089,252 | B2 | 8/2006 | Tomlin et al. | |
| 2001/0020238 | A1* | 9/2001 | Tsuda | 707/5 |
| 2005/0246623 | A1* | 11/2005 | Ma et al. | 715/501.1 |
| 2006/0036598 | A1 | 2/2006 | Wu | |
| 2006/0041553 | A1* | 2/2006 | Paczkowski et al. | 707/7 |
| 2006/0095430 | A1 | 5/2006 | Zeng et al. | |
| 2006/0235841 | A1 | 10/2006 | Betz et al. | |
| 2006/0294124 | A1 | 12/2006 | Cho | |
| 2007/0005566 | A1 | 1/2007 | Bobick et al. | |

OTHER PUBLICATIONS

Berberick, et al. "Time-aware Authority Ranking", In *Algorithms and Models for Web-Graph: Third International Workshop*, WAW 2004, pp. 131-141, Springer-Verlag, 2004.
Boldi, et al. "PageRank as a Function of the Damping Factor", In *Proceedings of the 14th International World Wide Web Conference*, May 10-14, 2005, Chiba, Japan.
Brin, et al. "The Anatomy of a Large-Scale Hypertextual Web Search Engine", In *Proceedings of the Seventh International Wide Web Conference*, Australia, 1998.
Del Corso, et al. "Fast PageRank Computation via a Sparse Linear System", *Internet Mathematics*, vol. 2, No. 3, pp. 251-273, 2005.

(Continued)

*Primary Examiner*—James Trujillo
*Assistant Examiner*—Bruce M Moser
(74) *Attorney, Agent, or Firm*—Perkins Coie LLP

(57) ABSTRACT

A method and system for determining temporal importance of documents having links between documents based on a temporal analysis of the links is provided. A temporal ranking system collects link information or snapshots indicating the links between documents at various snapshot times. The temporal ranking system calculates a current temporal importance of a document by factoring in the current importance of the document derived from the current snapshot (i.e., with the latest snapshot time) and the historical importance of the document derived from the past snapshots. To calculate the current temporal importance of a web page, the temporal ranking system aggregates the importance of the web page for each snapshot.

22 Claims, 4 Drawing Sheets

OTHER PUBLICATIONS

Gyongyi, et al. "Link Spam Alliance", *Technical Report*, Stanford University, 2005.
Gyongyi, et al. "Web Spam Taxonomy", In the *First International Workshop on Adversarial Information Retrieval on the Web*, 2005.
Haveliwala, et al. "An Analytical Comparison of Approaches to Personalizing PageRank", *Technical Report*, Stanford University, 2003.
Haveliwala. "Efficient Computation of PageRank", *Technical Repor*, Stanford University, Oct. 18, 1999.
Kleinberg. "Authoritative Sources in a Hyperlinked Environment", In *Journal of the ACM*, 46(5): 604-632, 1999.
Kumar, et al. "Extracting large-scale knowledge bases from the web", *Proceedings of the 25th VLDB Conference*, Edinburgh, Scotland, 1999 (12 pages).
Langville, et al. "Deeper Inside PageRank", *Internet Mathematics*, 1(3): 335-380, 2004.
Lawrence, et al. "Context and Page Analysis for Improved Web Search", *IEEE Internet Computing*, Jul.-Aug. 1998 (pp. 38-45).
McSherry. "A Uniform Approach to Accelerated PageRank Computation", In *Proceedings of the 14th International World Wide Web Conference*, 2005.
Page, et al. "The PageRank Citation Ranking: Bringing Order to the Web", *Technical Report*, Stanford University, Stanford, CA, 1998.
Richardson, et al. "Beyond PageRank: Machine Learning for Static Ranking", In *Proceedings of the Fifteenth International World Wide Web Conference*, pp. 707-715, 2006.
Richardson, et al. "The Intelligent Surfer: Probabilistic Combination of Link and Content Information in PageRank" In *Advances in Neural Information Processing Systems* 14, pp. 1441-1448, 2002.
Brin, et al., "What can you do with a Web in your Pocket?", *Data Engineering Bulletin*, 21(3):37-47, 1998.
Haveliwala, "Topic-Sensitive PageRank," *In Proceedings of the International World Wide Web Conference*, 2002 (10 pages).
International Search Report for Application No. PCT/US2008/060144; Applicant: Microsoft Corporation; Date of Mailing: Aug. 29, 2008 (3 pages).

* cited by examiner

CALCULATING IMPORTANCE OF DOCUMENTS FACTORING HISTORICAL IMPORTANCE

BACKGROUND

Many search engine services, such as Google and Overture, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure.

Three well-known techniques for page ranking are PageRank, HITS ("Hyperlink-Induced Topic Search"), and DirectHIT. PageRank is based on the principle that web pages will have links to (i.e., "out links") important web pages. Thus, the importance of a web page is based on the number and importance of other web pages that link to that web page (i.e., "in links"). In a simple form, the links between web pages can be represented by adjacency matrix A, where $A_{ij}$ represents the number of out links from web page i to web page j. The importance score $w_j$ for web page j can be represented by the following equation:

$$w_j = \sum_i A_{ij} w_i$$

This equation can be solved by iterative calculations based on the following equation:

$$A^T w = w$$

where w is the vector of importance scores for the web pages and is the principal eigenvector of $A^T$.

The HITS technique is additionally based on the principle that a web page that has many links to other important web pages may itself be important. Thus, HITS divides "importance" of web pages into two related attributes: "hub" and "authority." "Hub" is measured by the "authority" score of the web pages that a web page links to, and "authority" is measured by the "hub" score of the web pages that link to the web page. In contrast to PageRank, which calculates the importance of web pages independently from the query, HITS calculates importance based on the web pages of the result and web pages that are related to the web pages of the result by following in links and out links. HITS submits a query to a search engine service and uses the web pages of the result as the initial set of web pages. HITS adds to the set those web pages that are the destinations of in links and those web pages that are the sources of out links of the web pages of the result. HITS then calculates the authority and hub score of each web page using an iterative algorithm. The authority and hub scores can be represented by the following equations:

$$a(p) = \sum_{q \to p} h(q) \text{ and } h(p) = \sum_{p \to q} a(q)$$

where a(p) represents the authority score for web page p and h(p) represents the hub score for web page p. HITS uses an adjacency matrix A to represent the links. The adjacency matrix is represented by the following equation:

$$b_{ij} = \begin{cases} 1 & \text{if page } i \text{ has a link to page } j, \\ 0 & \text{otherwise} \end{cases}$$

The vectors a and h correspond to the authority and hub scores, respectively, of all web pages in the set and can be represented by the following equations:

$$a = A^T h \text{ and } h = Aa$$

Thus, a and h are eigenvectors of matrices $A^T A$ and $AA^T$. HITS may also be modified to factor in the popularity of a web page as measured by the number of visits. Based on an analysis of clickthrough data, $b_{ij}$ of the adjacency matrix can be increased whenever a user travels from web page i to web page j.

Although these techniques for ranking web pages based on analysis of links can be very useful, they are susceptible to "link spamming." "Spamming" in general refers to a deliberate action taken to unjustifiably increase the popularity or importance of a web page or web site. In the case of link spamming, a spammer can manipulate links to unjustifiably increase the importance of a web page. For example, a spammer may increase a web page's hub score by adding out links to the spammer's web page. A common technique for adding out links is to create a copy of an existing link directory to quickly create a very large out link structure. As another example, a spammer may provide a web page of useful information with hidden links to spam web pages. When many web pages may point to the useful information, the importance of the spam web pages is indirectly increased. As another example, many web sites, such as blogs and web directories, allow visitors to post links. Spammers can post links to their spam web pages to directly or indirectly increase the importance of the spam web pages. As another example, a group of spammers may set up a link exchange mechanism in which their web sites point to each other to increase the importance of the web pages of the spammers' web sites.

Web spam, and in particular link spamming, presents problems for various techniques that rely on web data. For example, a search engine service that orders search results in part based on popularity or importance of web pages may rank spam web pages unjustifiably high because of the spamming. The correct ranking of web pages of a search result is very important to search engine services. If users of a search engine service perceive that the ranking of web pages of search results does not conform to their idea of importance or relevance for whatever reason (e.g., link spam), the users may turn to a different search engine service. Since the revenue of a search engine service is closely correlated to the number of users, poor performance in ranking web pages of search results can result in loss of revenue for the search engine service.

SUMMARY

A method and system for determining temporal importance of documents having links between documents based on a temporal analysis of the links is provided. A temporal ranking system collects link information or snapshots indicating the links between documents at various snapshot times. The temporal ranking system calculates a current temporal importance of a document by factoring in the current importance of the document derived from the current snapshot (i.e., with the latest snapshot time) and the historical importance of the document derived from past snapshots. To calculate the current temporal importance of a web page, the temporal ranking system aggregates the importance of the web page for each snapshot. The temporal ranking system may provide the temporal importance of the documents to a search engine service so that it can rank documents based at least in part on their temporal importance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
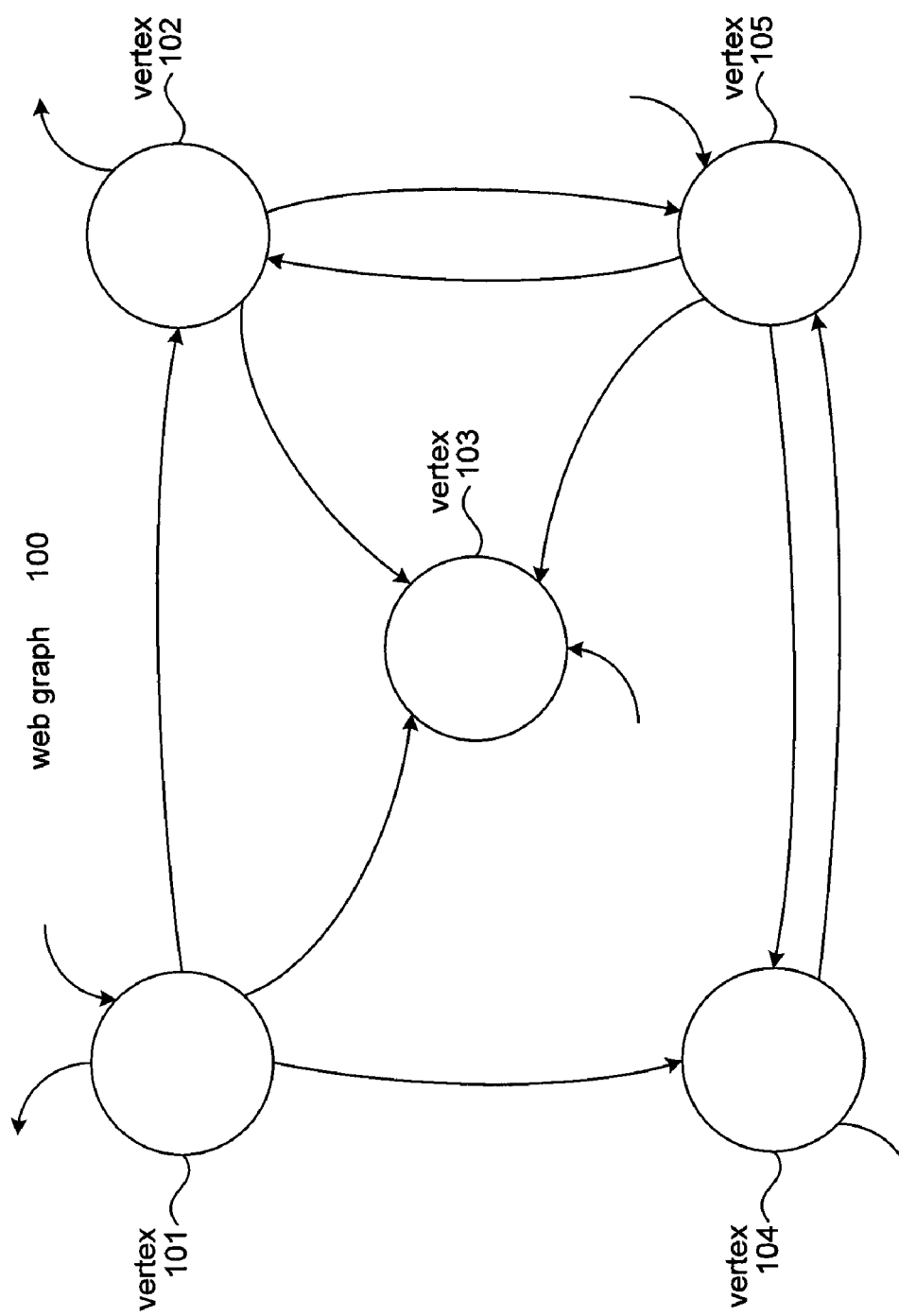
FIG. 1 is a diagram that illustrates a portion of a web graph.

A method and system for determining temporal importance of documents having links between documents based on a temporal analysis of the links is provided. In some embodiments, a temporal ranking system collects link information or snapshots indicating the links between documents (or more generally objects) at various snapshot times. For example, when the documents are web pages, a web crawler may crawl the web to identify web pages and the links between the web pages. The web crawler may represent the web pages and links as a web graph with vertices and edges. A web graph corresponds to a snapshot of the web at the time it was crawled, referred to as its snapshot time. The temporal ranking system calculates a current temporal importance of a document by factoring in the current importance of the document derived from the current snapshot (i.e., with the latest snapshot time) and the historical importance of the document derived from the past snapshots. For example, the temporal ranking system may use a page rank algorithm to calculate the importance of the web pages for each snapshot. The term "temporal importance" refers to an importance score that is based on multiple snapshots, and the term "importance" refers to an importance score that is based on a single snapshot. To calculate the current temporal importance of a web page, the temporal ranking system aggregates the importance of the web page for each snapshot. Because the temporal ranking system calculates a current temporal importance of a document based on the current snapshot and one or more past snapshots, a document whose current importance is increased by link spam that is introduced in the current snapshot will have a current temporal importance that is lower because of its historically lower overall importance (based on the past snapshots).

In some embodiments, the temporal ranking system provides a weighting factor that can be used to designate the relative contribution to the current temporal importance of the current importance derived from the current snapshot and the historical importance derived from past snapshots. For example, the weighting factor may be set to a value between zero and one. A value of zero indicates that the current importance contributes nothing to the current temporal importance and that the current temporal importance is the historical importance. A value of one-half indicates that the current importance and the historical importance contribute equally to the current temporal importance. A value of one indicates that the historical importance contributes nothing to the current temporal importance and that the current temporal importance degenerates to the current importance. The weighting factor can be set based on how accurately the current importance derived from the current snapshot reflects the actual importance of the web pages.

In some embodiments, the temporal ranking system provides a decay factor that is used to reduce the relative contribution of a snapshot to the current temporal importance of web pages over time. When a decay factor is applied, the contribution from a snapshot decreases as additional snapshots are collected. For example, the decay factor may indicate that the contribution of a snapshot decreases by 50% from one snapshot time to the next. The contribution of the second newest snapshot may be 50% of its importance, the contribution of the third newest snapshot may be 25% of its importance, the contribution of the fourth newest snapshot may be 12.5% of its importance, and so on.

In some embodiments, the temporal ranking system applies a mechanic model when determining an appropriate decay factor for each snapshot. Using the mechanic model, the temporal ranking system considers the current importance of the current snapshot to have a driving force and the historical importance of the past snapshots to have a resisting force. The total force derived from all the snapshots is the driving force adjusted by an enhancement factor minus the resisting force adjusted by a damping factor. The mechanic model is analogous to the mechanics of physical motion in which an object to which a driving force is applied may also have a resisting force. The total force on the object is the driving force minus the resisting force. According to Newton's second law relating to physical motion, the force of an object is its mass times its acceleration (e.g., the derivative of velocity). Applying an analogous law to the calculation of temporal importance, the total force derived from all past snapshots is "mass" of a web page times the "acceleration" of the historical importance of the web page. The historical importance can thus be considered to be a "velocity." The "mass" of a web page may represent an intrinsic quality of a web page. In some embodiments, all web pages are assumed to have the same mass. The "acceleration" of a web page is the rate of change in historical importance. As described below in more detail, by setting the total force of a web page (i.e., driving force adjusted by an enhancement factor and a resisting force adjusted by a damping factor) to mass times acceleration of the web page, a solution for velocity or temporal importance of a web page can be obtained. The solution provides an equation from which the weighting factor and the decay factor can be derived from the enhancement factor and the damping factor. Conceptually, the damping factor represents how much historical importance will contribute to the current temporal importance, and the enhancement factor is a constant that does not affect the relative temporal importance of the web pages. The damping factor, which may be the same for all snapshots, may provide a more intuitive model for understanding the parameters controlling the temporal ranking system.

The temporal ranking system calculates temporal importance scores for web pages based on both the current web graph (i.e., a snapshot) and historical information contained in previous web graphs. The temporal ranking system represents the current temporal importance of a web page by the following:

$$TR_k(i) = (1-\beta)H_k(i) + \beta PR_k(i) \tag{1}$$

where k represents the number of snapshots of a web graph G, $TR_k(i)$ represents the current temporal importance score for document i for snapshot time k, $PR_k(i)$ represents the current importance score for document i at snapshot time k derived from web graph $G_k$, $H_k(i)$ represents the historical importance score for document i derived from web graphs $G_1, G_2, \ldots G_{k-1}$, β represents a weighting factor for current importance scores for snapshot time k, and 1−β represents a weighting factor for historical importance scores for snapshot times 1 to k−1. The weighting factor β may be set based on the perceived reliability of the current snapshot. If β equals 1, then the current snapshot is considered to be completely reliable and past snapshots are ignored. The temporal ranking system represents the historical importance scores as follows:

$$H_k(i) = \sum_{t=1}^{k-1} \gamma_t PR_t(i) \tag{2}$$

where $\gamma_t$ represents a decay factor indicating how much the importance from each snapshot contributes to the historical importance score. In general, the earlier a snapshot is, the less amount of importance it should contribute to the historical importance score. The temporal ranking system may combine Equations 1 and 2 as follows:

$$TR_k(i) = (1-\beta)\sum_{t=1}^{k-1} \gamma_t PR_t(i) + \beta PR_k(i). \tag{3}$$

The temporal ranking system may use a "mechanic model" to derive parameters for controlling the decay and weighting factors. The temporal ranking system assumes that importance corresponds to the velocity of an object. If a page i gets an importance score $PR_t(i)$ for the current snapshot $G_t$, the temporal ranking system will add a corresponding driving force to a virtual force $F_t(i)$ for this page. The temporal ranking system assumes that the decay for a temporal importance score $TR_t(i)$ is a resisting force that has a negative effect on the virtual force. The temporal ranking system represents the model as follows:

$$F_t(i) = -\lambda TR_t(i) + \eta PR_t(i) \tag{4}$$

where η (η>0) represents an enhancement constant for the driving force and λ (λ≧0) represents the decay factor. The temporal ranking system represents the virtual force by the following:

$$F_t(i) = m(i)\frac{dTR_t(i)}{dt} \tag{5}$$

where m(i) is an intrinsic quality of web page i with similar meaning to that of mass. Conceptually, the virtual force is represented as mass times acceleration. The temporal ranking system combines Equations 4 and 5 as a first-order ordinary differential equation as follows:

$$\frac{dTR_t(i)}{dt} + \frac{\lambda}{m(i)}TR_t(i) = \frac{\eta}{m(i)}PR_t(i). \tag{6}$$

A general solution to Equation 6 is as follows:

$$TR_k(i) = e^{-\frac{\lambda}{m(i)}k}\left[\int_0^k \frac{\eta}{m(i)}PR_t(i)e^{-\frac{\lambda}{m(i)}t}dt + C_0\right], \tag{7}$$

where $C_0$ is the integral constant. If all the web pages are assumed to have the same initial importance score at the beginning (t=0), then $$TR_0(i) = \frac{1}{N},$$

where N is the number of web pages in the web graph. Given this assumption, then the solution can be represented as follows:

$$TR_k(i) = \frac{1}{N}e^{-\frac{\lambda}{m(i)}k} + \frac{\eta}{m(i)}\int_0^k PR_t(i)e^{-\frac{\lambda}{m(i)}(k-t)}dt. \tag{8}$$

Since the web graph data is discrete snapshots with respect to time, the temporal ranking system converts Equation 8 to its discrete form as follows:

$$TR_k(i) = \frac{1}{N}e^{-\frac{\lambda}{m(i)}k} + \frac{\eta}{m(i)}\sum_{t=1}^{k} PR_t(i)e^{-\frac{\lambda}{m(i)}(k-t)}. \tag{9}$$

Equation 9 can be reformulated to separate the initial importance scores, the historical importance scores, and the current importance scores as follows:

$$TR_k(i) = \frac{1}{N}e^{-\frac{\lambda}{m(i)}k} + \frac{\eta}{m(i)}\sum_{t=1}^{k-1} PR_t(i)e^{-\frac{\lambda}{m(i)}(k-t)} + \frac{\eta PR_k(i)}{m(i)}. \tag{10}$$

The first term on the right of Equation 10 represents a constant with respect to web page i and represents the initial importance score; the second term represents a linear combination of the importance scores of web page i in past web graphs represented by $H_k(i)$; and the third term represents the current importance score of web page i in the current web graph. If the constant is ignored, the decay and weighting factors can be represented as follows:

$$\gamma_t = \frac{\eta}{m(i) - \eta} e^{-\frac{\lambda}{m(i)}(k-t)}, \text{ and} \quad (11)$$

$$\beta = \frac{\eta}{m(i)}$$

The weighting factor $\lambda$ ($\lambda \geq 0$) represents the weight that the historical importance scores contribute to the current temporal importance score. The factor m(i) is an intrinsic quality for each web page. In one embodiment, the temporal ranking system may set m(i) to the same for all web pages. The enhancement constant $\eta$ does not affect the ranking of the pages if $\lambda$ and m(i) are fixed. To ensure that the weighting factor is between zero and one, the temporal ranking system sets $\eta$ to a value of greater than zero and less than m.

FIG. 1 is a diagram that illustrates a portion of a web graph. A web graph is generated by crawling the web and identifying the out links on web pages of web sites that are encountered. In this example, a portion of web graph 100 contains vertices 101-105 representing five web sites and edges between the vertices representing out links. For example, the edge between vertices 101 and 103 represents an out link of the web site represented by vertex 101 to the web site represented by vertex 103. Thus, the web site represented by vertex 103 is the target of the out link represented by the edge. That same edge is also an in link to the web site represented by vertex 103. Thus, the web site represented by vertex 101 is the source of the in link represented by the edge. The temporal ranking system may represent the web graph using an adjacency matrix with each web site represented as a row and a column of the matrix. A nonzero entry for a row and a column may indicate that the web site represented by the row has an out link to the web site represented by that column. The temporal ranking system may use various techniques to represent web graphs including sparse matrix storage techniques. The temporal ranking system may also store differences between the web graph from one snapshot time to the next snapshot rather than storing the entire web graph multiple times.

Since new web pages are frequently added to and old web pages are frequently removed from the web, each snapshot will likely have different numbers of web pages. The temporal ranking system may account for different numbers of web pages in different snapshots by maintaining an aggregate list of all web pages in all snapshots. When the importance scores for the web pages of a snapshot are calculated, the temporal ranking system adds importance scores of zero for those web pages of the aggregate list that are not in the snapshot. In this way, vectors representing the importance scores for each snapshot will have the same length.

Figure 2:
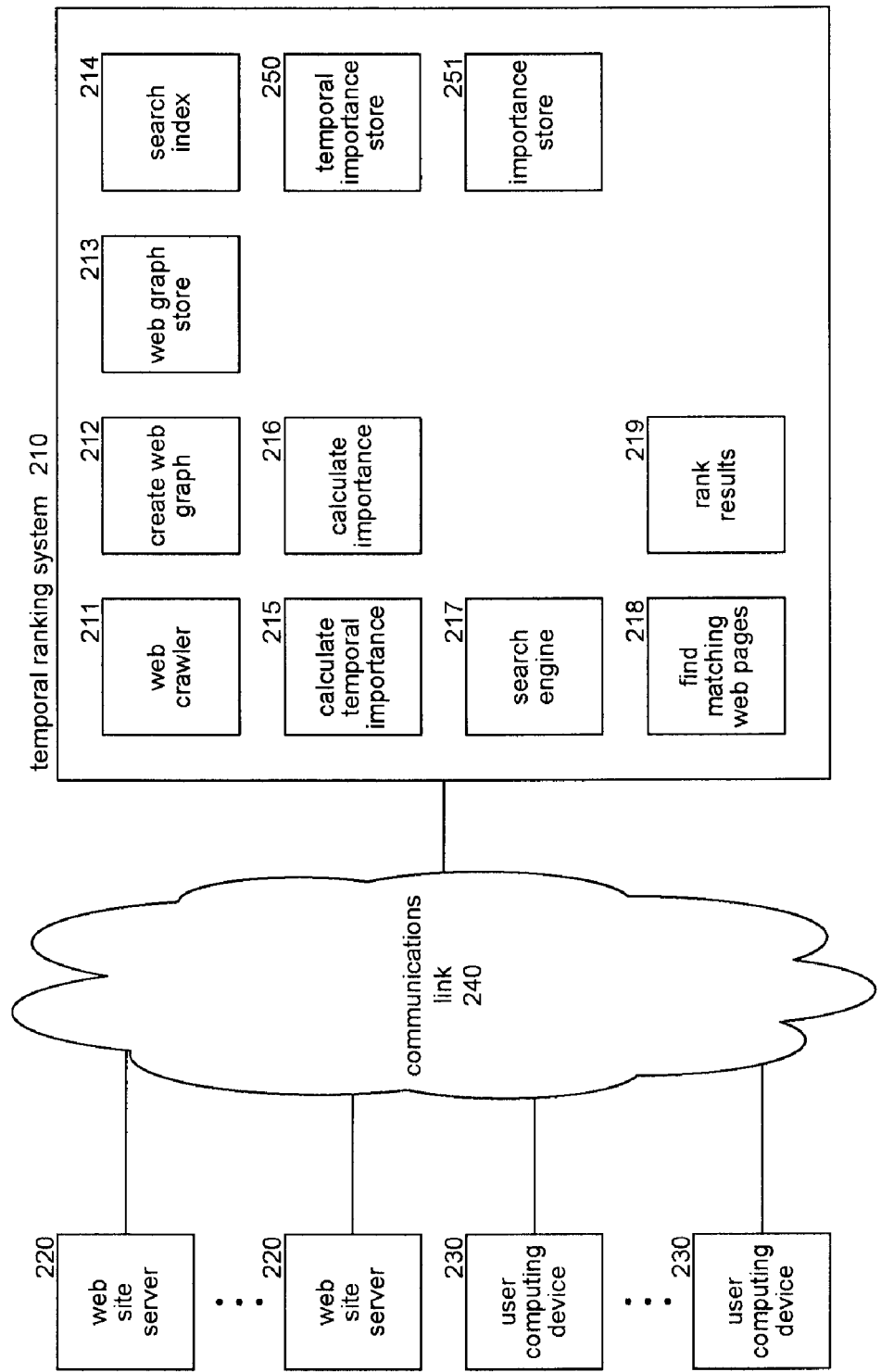
FIG. 2 is a block diagram that illustrates components of a temporal ranking system that ranks web pages based on snapshots of web graphs taken over time in one embodiment.

FIG. 2 is a block diagram that illustrates components of a temporal ranking system that ranks web pages based on snapshots of web graphs taken over time in one embodiment. A temporal ranking system 210 is connected to web site servers 220 and user computing devices 230 via a communications link 240. The temporal ranking system may include a web crawler 211, a create web graph component 212, a web graph store 213, and a search index store 214. The web crawler crawls the web pages of the web site servers to identify web pages and the links between the web pages. The web crawler may generate a mapping of keywords to web pages and store the mapping in the search index store. The web crawler may also provide an indication of the web pages and links to a create web graph component that generates a representation of the web graph corresponding to a snapshot of the web. The create web graph component may represent a web graph by an adjacency matrix that is stored in the web graph store. The web crawler may be scheduled to crawl the web pages periodically or on an ad hoc basis. In either case, the web crawler associates a snapshot time with each snapshot. Although the temporal ranking system in some embodiments assumes that the snapshot times are equally spaced, one skilled in the art will appreciate that the snapshot times need not be equally spaced. In such a case, the calculation of the damping factor or the decay factor for a snapshot may take into consideration its actual snapshot time relative to the current snapshot time.

The temporal ranking system includes a calculate temporal importance component 215, a calculate importance component 216, a temporal importance store 250, and an importance store 251. The calculate temporal importance component calculates a current temporal importance score for each web page based on the importance scores derived from the current snapshot and the historical importance derived from past snapshots. The calculate temporal importance component invokes the calculate importance component to calculate the importance scores of the web pages based on a single snapshot. The calculate importance component may implement a conventional algorithm such as a page rank algorithm or a hub and authority algorithm and store the importance scores for each snapshot in the importance store. The calculate temporal importance component may store the temporal importance scores in the temporal importance store for use in ranking web pages.

The temporal ranking system may also include a search engine component 217, a find matching web pages component 218, and a rank results component 219. Users of the user computing devices may submit search requests to the search engine component. The search engine component invokes the find matching web pages component to find web pages that match the search requests. The find matching web pages component may use a search index to identify the matching web pages. The search engine component then invokes the rank results component to rank the web pages of the results based on the temporal importance scores of the temporal importance store for the web pages of the search result. For example, the rank results component may combine a relevance score based on the relevance of a web page to the search request with the current temporal importance score generated by the temporal ranking system to provide an overall ranking score. The search engine component may then rank the web pages of the search result based on the ranking scores.

The computing device on which the temporal ranking system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the instructions, data structures, and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the temporal ranking system may be implemented in or used in conjunction with various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The temporal ranking system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, a separate computing system may crawl the web and generate the web graphs. Another computing system may provide a search engine that uses the temporal importance scores to rank search results.

Figure 3:
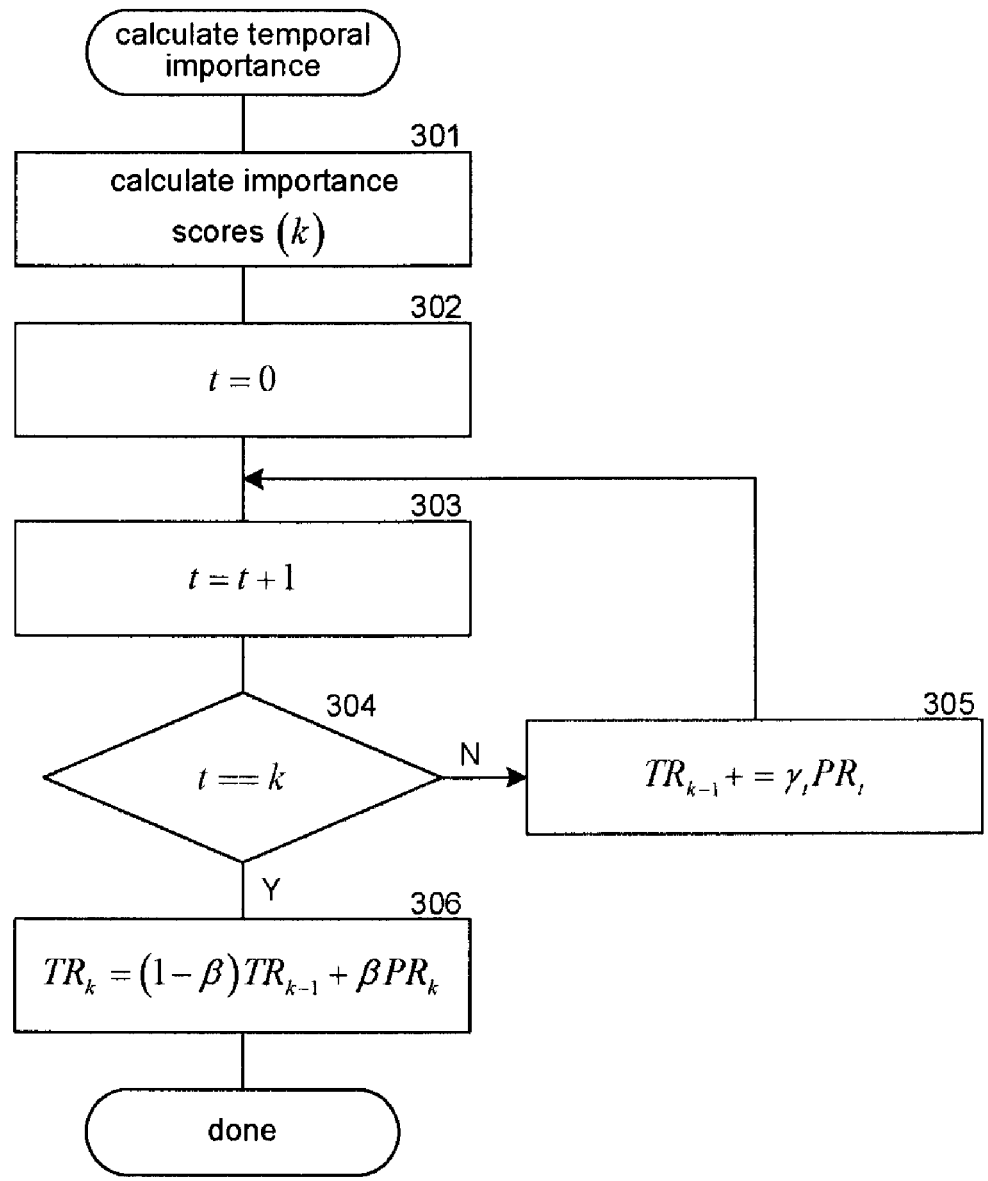
FIG. 3 is a flow diagram that illustrates high-level processing of a calculate temporal importance component of the temporal ranking system in some embodiments.

FIG. 3 is a flow diagram that illustrates high-level processing of a calculate temporal importance component of the temporal ranking system in some embodiments. The component is invoked to calculate the temporal importance scores based on analysis of multiple snapshots of the web. In block 301, the component calculates the importance scores for the web pages for each snapshot. For example, the component may use a page rank algorithm or a hub and authority algorithm. As described above, the component may save the importance scores for each snapshot in the importance store to avoid recalculating of the importance scores each time a new snapshot is collected. In blocks 302-305, the component loops aggregating the contribution of the past importance scores into a historical importance score for each web page. In block 302, the component initializes a variable to track the snapshots. In block 303, the component increments the variable to select the next snapshot. In decision block 304, if all the snapshots have already been selected, then the component continues at block 306, else the component continues at block 305. In block 305, the component accumulates the importance scores for the web pages for the selected snapshot into the historical importance score based on a weighting factor. The component then loops to block 303 to select the next snapshot. In block 306, the component generates a current temporal importance score for each web page as a weighted combination of the historical importance score of the web page and the current importance score of the web page. The component then completes.

Figure 4:
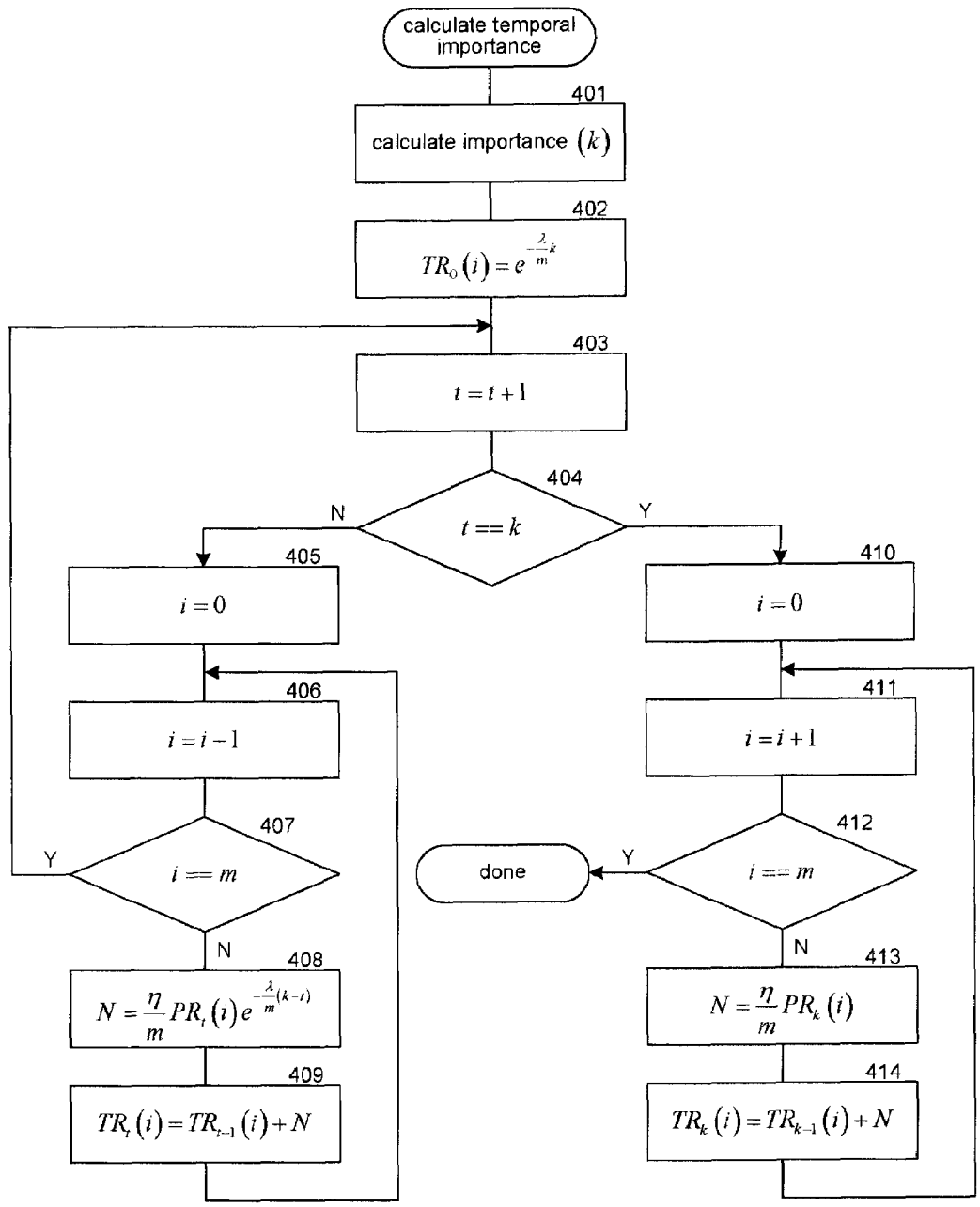
FIG. 4 is a flow diagram that illustrates low-level processing of a calculate temporal importance component of the temporal ranking system in some embodiments.

FIG. 4 is a flow diagram that illustrates low-level processing of a calculate temporal importance component of the temporal ranking system in some embodiments. In block 401, the component calculates the importance score for the web pages of the current snapshot. In block 402, the component initializes a temporal importance score for each web page according to the first term of Equation 10. In blocks 403-409, the component loops calculating the historical importance scores based on the past snapshots according to the second term of Equation 10. In block 403, the component selects the next snapshot starting with the oldest snapshot. In decision block 404, if all the past snapshots have already been selected, then the component continues at block 410, else the component continues at block 405. In blocks 405-409, the component loops calculating the historical importance scores for each web page. In block 405, the component initializes an index for the web pages. In block 406, the component selects the next web page of the selected snapshot. In decision block 407, if all the web pages have already been selected, then the component loops to block 403 to select the next snapshot, else the component continues at block 408. In block 408, the component calculates a weighted importance score for the selected web page from the importance score of the web page within the selected snapshot. In block 409, the component combines the weighted importance score with the historical importance score for the last snapshot to provide a historical importance score for the selected web page of the selected snapshot. The component then loops to block 406 to select the next web page of the selected snapshot. In blocks 410-414, the component loops calculating a weighted importance score for each web page of the current snapshot and adding it to the historical importance score for the web pages according to the third term of Equation 10. In block 410, the component initializes an index for the web pages. In block 411, the component increments the index to select the next web page. In decision block 412, if all the web pages of the current snapshot have already been selected, then the component completes, else the component continues at block 413. In block 413, the component calculates the weighted importance score for the selected web page based on the importance score for the selected web page as calculated in block 401. In block 414, the component combines the historical importance score for the selected web page as calculated in block 409 and weighted importance score into a current temporal importance score for the selected web page. The component then loops to block 411 to select the next web page of the current snapshot.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. One skilled in the art will appreciate that the temporal importance scores may be used in any application which uses importance of documents. For example, the documents may be patents and the links may be citations to other patents or the documents may be scholarly articles and the links may be citations to other scholarly articles. The temporal importance scores may also be used to rate authors based on the importance of their writings. Accordingly, the invention is not limited except as by the appended claims.

I/We claim:

1. A method in a computing device for determining temporal importance of documents in a collection of documents having links between documents, the documents in the collection and the links between the documents in the collection changing over time, the method comprising:

providing link information for various snapshots of the collection of documents, each snapshot representing the documents in the collection and the links between the documents in the collection at a certain time, the link information for a snapshot indicating links between the documents of the collection for the snapshot;

for each snapshot, calculating by the computing device importance scores for the documents based on the link information of the snapshot; and aggregating by the computing device the calculated importance scores for the snapshots for a document to provide a temporal importance score for the document that factors in changes over time to documents in the collection and to the links between the documents in the collection.

2. The method of claim 1 wherein the aggregating of the calculated importance scores weights importance scores for more recent snapshots more heavily than for less recent snapshots.

3. The method of claim 1 wherein the documents are web pages, the links are hyperlinks between documents, and the link information is a representation of a web graph.

4. The method of claim 3 wherein the web graph is represented by an adjacency matrix.

5. The method of claim 1 wherein the calculating of importance scores applies a page rank algorithm.

6. The method of claim 1 wherein the calculating of importance scores applies a hub and authority algorithm.

7. The method of claim 1 including receiving an indication of documents of a search result and ranking the documents of the search result based on the temporal importance scores of the documents.

8. A method in a computing device for determining temporal importance of documents having links between documents, the method comprising:
   providing link information for various snapshots, the link information indicating links between the documents;
   for each snapshot, calculating by the computing device importance scores for the documents based on the link information of the snapshot; and
   aggregating by the computing device the calculated importance scores for the snapshots for a document to provide a temporal importance score for the document,
   wherein the aggregating is performed according to the following:

$$TR_k(i) = (1-\beta)\sum_{t=1}^{k-1} \gamma_t PR_t(i) + \beta PR_k(i)$$

where k represents the number of snapshots, $TR_k(i)$ represents the temporal importance score for document i for snapshot k, $PR_t(i)$ represents the importance score for document i for snapshot t, $PR_k(i)$ represents the importance score for document i for snapshot k, $\beta$ represents a weighting factor for current importance scores for snapshot k, $1-\beta$ represents a weighting factor for past importance scores for snapshots 1 to k−1, and $\gamma_t$ represents a decay factor for past importance scores.

9. A method in a computing device for determining temporal importance of documents having links between documents, the method comprising:
   providing link information for various snapshots, the link information indicating links between the documents;
   for each snapshot, calculating importance scores for the documents based on the link information of the snapshot; and
   aggregating the calculated importance scores for the snapshots for a document to provide a temporal importance score for the document,
   wherein the aggregating is performed according to the following:

$$TR_k(i) = \frac{1}{N} e^{-\frac{\lambda}{m(i)}k} + \frac{\eta}{m(i)}\sum_{t=1}^{k-1} PR_t(i) e^{-\frac{\lambda}{m(i)}(k-t)} + \frac{\eta PR_k(i)}{m(i)}$$

where k represents the number of snapshots, $TR_k(i)$ represents the temporal importance score for document i for snapshot k, $PR_t(i)$ represents the calculated importance score for document i for snapshot t, $PR_k(i)$ represents the importance score for document i for snapshot k, $m(i)$ represents an intrinsic quality of document i, N represents the number of documents, and $\lambda$ and $\eta$ represent parameters.

10. A computer-readable storage medium encoded with instructions for controlling a computing device for ranking web pages of a search result, by a method comprising:
    collecting at various times snapshots of the web indicating web pages and links between the web pages, each snapshot representing web pages and links between the web pages of the web at a certain time;
    for each snapshot, calculating importance scores for the web pages of the snapshot based on the link information;
    aggregating the importance scores for the snapshots for the web pages to provide temporal importance scores for the web pages, the temporal importance score for a web page being derived from the importance scores for the web page calculated for multiple snapshots; and
    generating a ranking of web pages of a search result of a search request by factoring in the temporal importance scores of the web pages.

11. The computer-readable storage medium of claim 10 wherein the generating of the ranking of the web pages factors in relevance of the web page to the search request.

12. The computer-readable storage medium of claim 10 wherein the aggregating of the importance scores applies a decay factor.

13. The computer-readable storage medium of claim 10 wherein a snapshot represents a web graph of the web pages and links.

14. The computer-readable storage medium of claim 10 wherein the calculating of importance scores applies a page rank algorithm.

15. The computer-readable storage medium of claim 10 wherein the calculating of importance scores applies a hub and authority algorithm.

16. A computer-readable storage medium encoded with instructions for controlling a computing device for ranking web pages of a search result, by a method comprising:
    collecting snapshots of the web indicating web pages and links between the web pages;
    calculating importance scores for the web pages of the snapshots based on the link information;
    aggregating the importance scores for the snapshots for the web pages to provide temporal importance scores for the web pages; and
    generating a ranking of web pages of a search result of a search request by factoring in the temporal importance scores of the web pages,
    wherein the aggregating is performed according to the following:

$$TR_k(i) = (1-\beta)\sum_{t=1}^{k-1} \gamma_t PR_t(i) + \beta PR_k(i)$$

where k represents the number of snapshots, $TR_k(i)$ represents the temporal importance score for document i for snapshot k, $PR_t(i)$ represents the importance score for document i for snapshot t, $PR_k(i)$ represents the importance score for document i for snapshot k, $\beta$ represents a weighting factor for current importance scores for snapshot k, $1-\beta$ represents a weighting factor for past importance scores for snapshots 1 to k−1, and $\gamma_t$ represents a decay factor for past importance scores.

17. A computer-readable storage medium encoded with instructions for controlling a computing device for ranking web pages of a search result, by a method comprising:
 collecting snapshots of the web indicating web pages and links between the web pages;
 calculating importance scores for the web pages of the snapshots based on the link information;
 aggregating the importance scores for the snapshots for the web pages to provide temporal importance scores for the web pages; and
 generating a ranking of web pages of a search result of a search request by factoring in the temporal importance scores of the web pages,
 wherein the aggregating is performed according to the following:

$$TR_k(i) = \frac{1}{N} e^{-\frac{\lambda}{m(i)}k} + \frac{\eta}{m(i)} \sum_{t=1}^{k-1} PR_t(i) e^{-\frac{\lambda}{m(i)}(k-t)} + \frac{\eta PR_k(i)}{m(i)}$$

where k represents the number of snapshots, $TR_k(i)$ represents the temporal importance score for document i for snapshot k, $PR_t(i)$ represents the calculated importance score for document i for snapshot t, $PR_k(i)$ represents the importance score for document i for snapshot k, m(i) represents an intrinsic quality of document i, N represents the number of documents, and $\lambda$ and $\eta$ represent parameters.

18. A computing system for determining temporal importance of web pages based on analysis of hyperlinks, comprising:
 a snapshot store that includes a snapshot of link information representing web pages and their hyperlinks collected at various snapshot times;
 a memory storing computer-executable instructions of
  a component that, for each of a plurality of snapshots, calculates importance scores for that snapshot for each of the web pages based on link information of the snapshot; and
  a component that aggregates for a web page the importance scores of the web page for different snapshots to provide a temporal importance score for the web page, the temporal importance score based on changes to importance of web pages over time; and
 a processor for executing the computer-executable instructions stored in the memory.

19. The computing system of claim 18 wherein the aggregating of the calculated importance scores weights importance scores for more recent snapshots more heavily than for less recent snapshots.

20. The computing system of claim 18 including a component that ranks web pages of a search result at least based on the temporal importance scores of the web pages.

21. A computing system for determining temporal importance of web pages based on analysis of hyperlinks, comprising:
 a snapshot store that includes a snapshot of link information representing web pages and their hyperlinks collected at various snapshot times;
 a memory storing computer-executable instructions of
  a component that calculates importance scores for web pages based on link information of a snapshot; and
  a component that aggregates for a web page the importance scores of the web page for different snapshots to provide a temporal importance score for the web page; and
 a processor for executing the computer-executable instructions stored in the memory,
 wherein the aggregating is performed according to the following:

$$TR_k(i) = (1-\beta) \sum_{t=1}^{k-1} \gamma_t PR_t(i) + \beta PR_k(i)$$

where k represents the number of snapshots, $TR_k(i)$ represents the temporal importance score for document i for snapshot k, $PR_t(i)$ represents the importance score for document i for snapshot t, $PR_k(i)$ represents the importance score for document i for snapshot k, $\beta$ represents a weighting factor for current importance scores for snapshot k, $1-\beta$ represents a weighting factor for past importance scores for snapshots 1 to k−1, and $\gamma_t$ represents a decay factor for past importance scores.

22. A computing system for determining temporal importance of web pages based on analysis of hyperlinks, comprising:
 a snapshot store that includes a snapshot of link information representing web pages and their hyperlinks collected at various snapshot times;
 a memory storing computer-executable instructions of
  a component that calculates importance scores for web pages based on link information of a snapshot; and
  a component that aggregates for a web page the importance scores of the web page for different snapshots to provide a temporal importance score for the web page; and
 a processor for executing the computer-executable instructions stored in the memory,
 wherein the aggregating is performed according to the following:

$$TR_k(i) = \frac{1}{N} e^{-\frac{\lambda}{m(i)}k} + \frac{\eta}{m(i)} \sum_{t=1}^{k-1} PR_t(i) e^{-\frac{\lambda}{m(i)}(k-t)} + \frac{\eta PR_k(i)}{m(i)}$$

where k represents the number of snapshots, $TR_k(i)$ represents the temporal importance score for document i for snapshot k, $PR_t(i)$ represents the calculated importance score for document i for snapshot t, $PR_k(i)$ represents the importance score for document i for snapshot k, m(i) represents an intrinsic quality of document i, N represents the number of documents, and $\lambda$ and $\eta$ represent parameters.

* * * * *